;(12) United States Patent
Overbay et al.

(10) Patent No.: US 6,908,406 B2
(45) Date of Patent: Jun. 21, 2005

(54) CONTINUOUSLY VARIABLE TRANSMISSION WITH ELASTOMERIC MESHING INTERFACE

(76) Inventors: Mark Albert Overbay, 244 Wells Fargo Dr., Farragut, TN (US) 37922; Thomas Christopher Widner, 11431 Glen Iris La., Knoxville, TN (US) 37922

( * ) Notice: Subject to any disclaimer, the term of this patent is extended or adjusted under 35 U.S.C. 154(b) by 80 days.

(21) Appl. No.: 10/379,854

(22) Filed: Mar. 5, 2003

(65) Prior Publication Data

US 2004/0176199 A1 Sep. 9, 2004

(51) Int. Cl.$^7$ .............................................. F16H 15/20
(52) U.S. Cl. ............................ 474/83; 474/54; 476/52
(58) Field of Search ............................ 474/3, 6, 47, 48, 474/49, 54, 53, 55, 83; 476/16, 47, 51, 52, 53, 55, 68

(56) References Cited

U.S. PATENT DOCUMENTS

| | | | | |
|---|---|---|---|---|
| 299,231 A | * | 5/1884 | Laird | 476/52 |
| 374,296 A | * | 12/1887 | Evans | 476/52 |
| 390,216 A | | 10/1888 | Evans | |
| 401,018 A | * | 4/1889 | Evans | 476/52 |
| 581,286 A | * | 4/1897 | Heywood | 475/211 |
| 627,491 A | | 6/1899 | Evans | |
| 742,977 A | | 11/1903 | Evans | |
| 2,432,442 A | | 12/1947 | Pourtier | |
| 2,583,790 A | | 1/1952 | Mikina | |
| 3,873,128 A | | 3/1975 | Dunder et al. | |
| 3,894,439 A | * | 7/1975 | Borello | 474/83 |
| 3,906,809 A | * | 9/1975 | Erickson | 474/83 |
| 5,069,078 A | | 12/1991 | Fairbanks | |
| 6,139,465 A | | 10/2000 | Holliday | |

* cited by examiner

Primary Examiner—David A. Bucci
Assistant Examiner—Vicky A. Johnson
(74) Attorney, Agent, or Firm—Michael E. McKee

(57) ABSTRACT

A system for transmitting power from a driving, or input, shaft to a driven, or output, shaft by way of an elastomeric belt nipped between opposing surfaces associated with the driving and driven shafts utilizes opposing surfaces which define a plurality of indentations disposed thereacross. Each indentation of the surfaces includes a cavity for accepting a portion of the elastomeric belt as the belt passes between the opposing surfaces and as edge which borders the cavity at the corresponding surface. As power is transmitted from the driving shaft to the driven shaft, significant shear and normal forces are applied between the edges of the indentations and the portions of the belt accepted by the indentations.

15 Claims, 2 Drawing Sheets

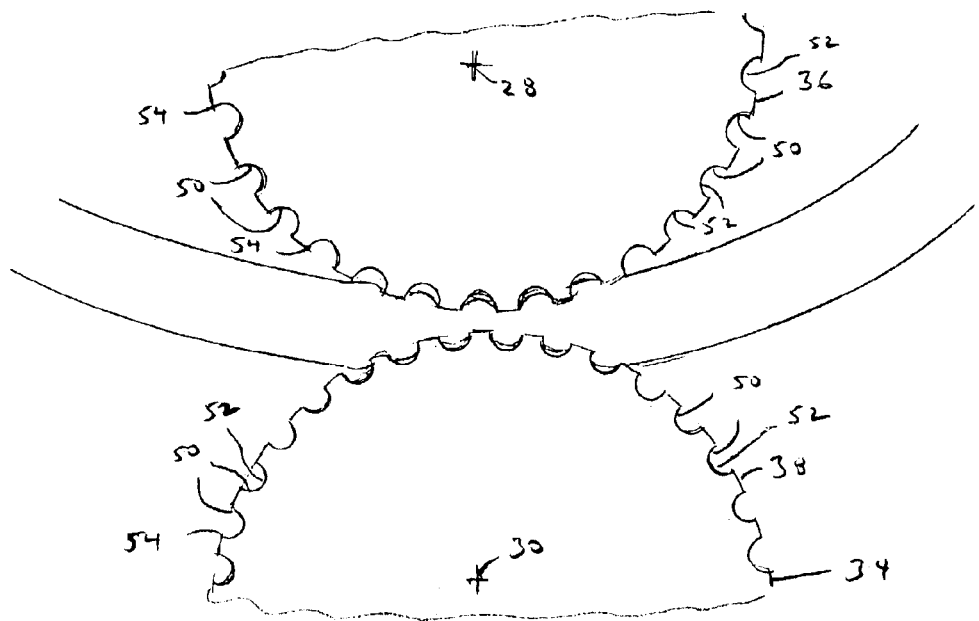
FIG. 4
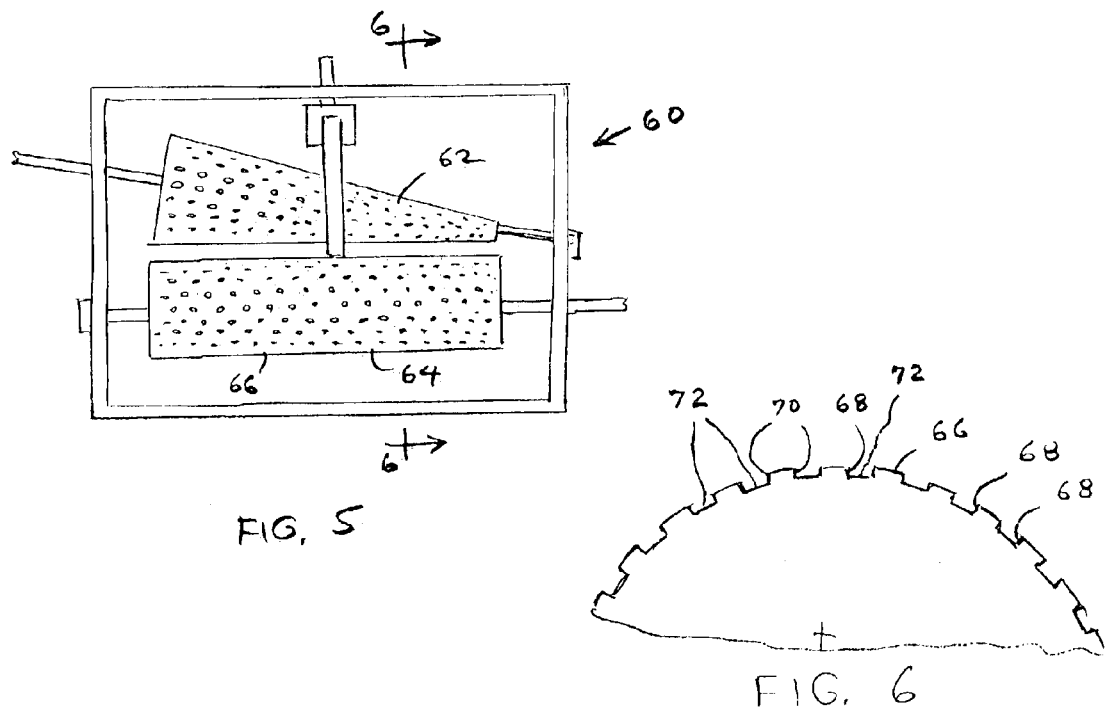
FIG. 5
FIG. 6

CONTINUOUSLY VARIABLE TRANSMISSION WITH ELASTOMERIC MESHING INTERFACE

BACKGROUND OF THE INVENTION

This invention relates generally to transmission construction and relates, more particularly, to means and methods by which power is transmitted from a driving shaft to a driven shaft within a transmission.

The class of transmissions with which this invention is to be compared includes a driving shaft, a driven shaft and a belt or ring which is nipped between the driving and driven shafts. The driving and driven shafts of such transmissions can, but may not always, have axes of rotation which are arranged in a common plane and wherein each of the driving and driven shafts include a conical surface which is disposed in close proximity to so as to oppose the conical surface of the other shaft. In addition, the belt or ring can encompass one of the cones so as to be nipped between the conical surfaces of the shafts so that power is transmitted from the driving shaft to the driven shaft by way of the belt or ring. By shifting the belt or ring axially of the conical surfaces, the relative speed of the shafts is altered accordingly. Examples of such driving/driven systems which utilize conical surfaces are shown and described in U.S. Pat. Nos. 390,216, 627,491, and 742,977.

A limitation associated with transmissions which embody driving/driven systems such as those described in the referenced patents relates to the possible slippage (defined as lost motion without component failure) which can occur between the conical surfaces and the belt or ring nipped therebetween. The likelihood of slippage in such devices can be reduced by increasing contact pressure between the conical surfaces and the belt, but often at the risk of jamming, stalling or excessive bearing wear.

It is an object of the present invention to provide a new and improved system for enhancing the transmission of driving forces between driving and driven shafts (e.g. input and output shafts) by way of a belt or ring nipped therebetween.

Another object of the present invention is to provide such a system which reduces the likelihood of slippage between the driving and driven shafts without increasing the likelihood of jamming, stalling or excessive bearing wear.

Still another object of the present invention is to provide such a system which is straightforward and uncomplicated in construction yet effective in operation.

SUMMARY OF THE INVENTION

This invention resides in an improvement to a system for transmitting driving forces from a driving, or input, shaft to a driven, or output, shaft by way of a structural elastomeric belt nipped between opposing surfaces associated with the driving and driven shafts.

The improvement is characterized in that each of the opposing surfaces defines a plurality of indentations disposed thereacross wherein each indentation includes a cavity for accepting a portion of the elastomeric belt as the belt passes between the opposing surfaces and an edge which borders the cavity at the corresponding surface. Therefore, as the driving shaft is driven, forces are transmitted between the edges of the indentations and the portions of the belt accepted by the indentations.

More specifically and during the transmission of driving power from the driving shaft to the driven shaft, the portions of the belt which are accepted by the indentations act as teeth against which the edges of the indentations apply significant shear and normal forces. It is the normal forces (i.e. those which are applied perpendicular to the surface of the belt) which differentiate the belt/surface interface of the present invention from so many surface-to-surface interfaces of the prior art. For example, whereas friction torque is purely applied by shear forces, the portions of the belt which are accepted by the surface indentations in the present invention are acted upon by both shear and normal forces.

BRIEF DESCRIPTION OF THE DRAWINGS

FIG. 4 is a cross-sectional view taken about along line 4—4 of FIG. 2.

FIG. 5 is a longitudinal section view similar to that of FIG. 1 of an alternative embodiment of a transmission.

FIG. 6 is a cross-sectional view of a fragment of the cylindrical pulley of the FIG. 5 transmission.

DETAILED DESCRIPTION OF THE ILLUSTRATED EMBODIMENTS

Figure 1:
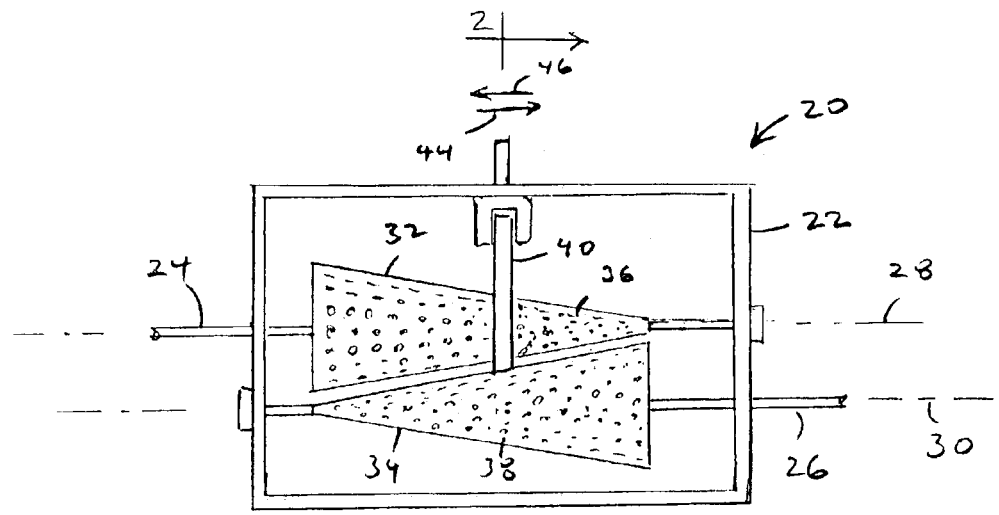
FIG. 1 is a longitudinal section view of an embodiment of a transmission within which features of the present invention are embodied.
Figure 2:
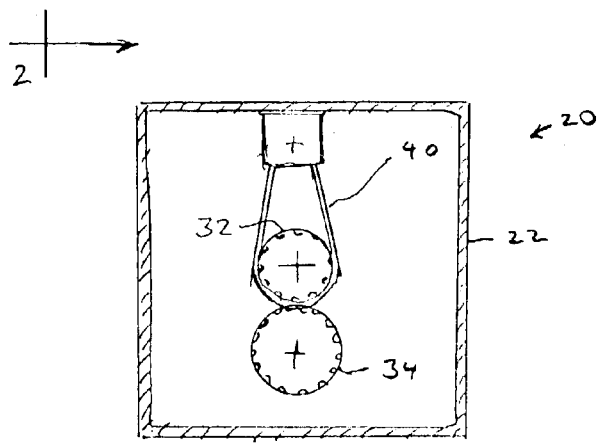
FIG. 2 is a cross-sectional view taken about along line 2—2 of FIG. 1.

Turning now to the drawings in greater detail, there is illustrated in FIGS. 1 and 2 an embodiment, generally indicated 20, of a transmission within which features of the present invention are incorporated. The transmission 20 includes a housing 22, a pair of shafts 24, 26 journaled within the housing 22 for rotation about parallel axes 28 and 30, and a pair of conical pulleys 32, 34. Each conical pulley 32 or 34 is fixedly positioned about a corresponding shaft 24 or 26 for rotation therewith and has a conical surface 36 or 38 which is positioned in relatively close proximity to so as to oppose the surface 38 or 36 of the other conical pulley 34 or 32. A structural endless ring, or belt 40, is positioned about and encircles the conical pulley 32 and is nipped, compressed or pinched, between the surfaces 36 or 38 of the conical pulleys 32, 34, and a movable guide mechanism 42 is mounted within the housing 22 and cooperates with (i.e. controls the position of) the endless belt 40 so that by shifting the guide mechanism 42 longitudinally of the housing 22 (e.g. in the direction of one of the arrows 44 or 46 of FIG. 1), the belt 40 is shifted longitudinally of the conical pulleys 32, 34 by a corresponding amount.

For purposes of the present description, the shaft 24 is designated herein as the driving, or input, shaft while the shaft 26 is designated as the driven, or output, shaft. Consequently, rotation of the driving shaft 24 about its axis 28 results in a corresponding rotation of the driven shaft 26 about its axis 30 as driving power is transmitted from the conical pulley 32 to the conical pulley 34 by way of the endless belt 40. As will be apparent herein, the conical pulleys 32, 34 cooperate with the belt 40 to enhance the transmission of driving forces from the pulley 32 to the pulley 34 and to reduce and substantially eliminate the likelihood of slippage of the belt 40 along the surfaces of the pulleys 32 and 34.

The structural elastomeric belt 40 is a compliant member which can be constructed of any of a number of elastomeric materials which provide the belt with a sufficient degree of flexibility, the capacity to be deformed when compressed between the surfaces of the pulleys 32, 34 in a manner described herein, and the capacity to return to its undeformed state after passing between the surfaces of the pulleys 32, 34. For example, the belt 40 can be constructed of a urethane material possessing any durometer (such as forty) within a relatively broad range of durometers.

Figure 3:
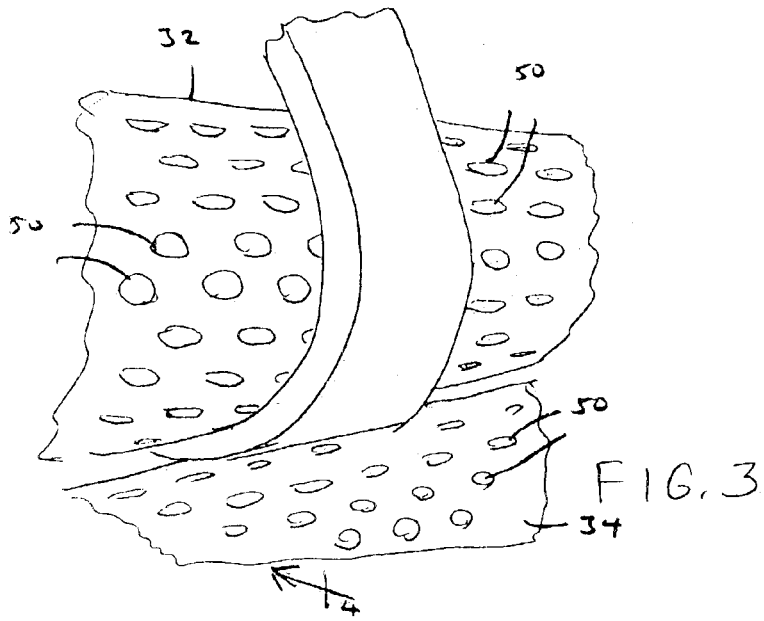
FIG. 3 is a perspective view of the interface between the pulleys and the belt of the FIG. 1 transmission, but drawn to a slightly larger scale.

As best shown in FIGS. 3 and 4, it is a feature of the conical pulleys 32, 34 that the surfaces 36 or 38 thereof include a plurality of indentations 50 disposed thereacross for accepting portions of the belt 40 as the belt 40 passes between the surfaces 36, 38 of the pulleys 32, 34. To this end, each indentation 50 of the pulley surfaces is concave (e.g. hemispherical) in form and includes a cavity 52 which extends inwardly of the pulley 32 or 34 from the surface 36 or 38 thereof and includes an edge 54 which surrounds the cavity 52 at the surface 36 or 38. By design, each cavity 52 is preferably of sufficient depth to permit an appreciable portion of the belt 40 to be accepted therein, and the edge 54 which borders each cavity 52 is relatively sharp. Therefore and as best shown in FIG. 4, when the belt 40 passes between the pulleys 32, 34 so that the belt 40 is compressed between the pulley surfaces 36, 38, the portions of the belt 40 which are in registry with the indentations 50 are accepted by the cavities thereof.

It follows from the foregoing that the pulley surface/belt interface of the transmission 20 can be characterized either as an elastomeric meshing or, in a sense, a coining interface in that as the belt 40 passes between the opposing pulley surfaces 36, 38, the pulley surfaces 36, 38 press against the opposite sides of the belt 40 in a manner which generally compresses the belt 40 yet permits the portions of the belt 40 which are disposed in registry with the indentations 50 to be accepted by the indentations 50. Consequently, the material out of which the belt 40 is constructed is capable of being deformed as the surfaces 36, 38 compress thereagainst and so that the portions of the belt 40 which are in registry with the indentations 50 deform, or distend, so as to be accepted by the indentation cavities.

During the transmission of driving power from the driving shaft 24 to the driven shaft 26 by way of the belt 40, the portions of the belt 40 which are accepted by the indentations 50 act as teeth against which the edges 54 of the indentations 50 apply significant shear and normal forces. (These normal forces are applied to the edges of the indentation-accepted portions along paths which are substantially perpendicular to the surface of the belt.) Therefore and unlike smooth-surfaced pulleys which rely only upon friction (i.e. shear forces) to force a belt therealong, the pulley surfaces 36, 38 are capable of transferring both shear and normal forces directly to the belt 40 by way of the interaction between the edges 54 of the indentations 50 and the belt.

Furthermore and as far as slippage between the belt 40 and the pulley surfaces 36, 38 is concerned, such slippage will probably never occur unless the belt 40 experiences catastrophic damage (e.g. a shearing off of the indentation-accepting portions of the belt 40) by the edges 54 of the indentations 50. Thus, to induce slippage between the belt 40 and pulley surfaces 36, 38, each indentation-accepting portion of the belt 40 would have to be exposed to an external tangential force which is greater than the product of the area of the engaged (or "shear-locked") indentation times the ultimate shear strength of the structural elastomeric belt 40. (As used herein, the term "shear-locked" refers to the displaced, or indentation-accepting, material of the belt 40 that receives normal forces applied thereto by way of the edges of the indentation.) In contrast, belt damage as a result of slippage is normally not a prerequisite to belt slippage along smooth-surfaced pulleys.

It therefore follows that the pulley surface/belt interface (i.e. the elastomeric meshing interface) of the transmission 20 enhances the capacity of the (drive) pulley 32 to transmit driving power to the (driven) pulley 34 by way of the belt 40. This is the case for the transmission of power from the belt 40 to the surface of the (driven) pulley 34, as well as the for the transmission of power from the surface of the (drive) pulley 32 to the belt 40.

The pulley surface/belt interface of the transmission 20 is advantageous in that there is no slippage or backlash when used to alter the relative rotational speeds between the driving and driven shafts 24, 26. Furthermore and unlike many transmission gear interfaces, the interface of this invention requires no lubrication. Further still, the interface components are scalable in that they can be sized larger or smaller to accommodate the application. Similarly, the interface components can be designed for altering the speed or power transmission ratio in a prescribed manner. For example, one of the pulleys 36 or 38 can be substituted for a conical pulley having an alternatively-sloped surface to provide the resulting transmission with an alternative range of speed or power-transmission ratio.

It follows that an interface between driving and driven shafts has been described which is suitable for use in any of a number of mechanical gear trains. The input to output gear (or speed) ratio of a gear train within which the interface is used is continually variable between and inclusive of prescribed gear ratio limits. Moreover, if this interface system is input-coupled to a planetary gear train (PGT), the transmission system is capable of both zero and reversed output motion for any given input motion and thus is considered to be an infinitely variable transmission (IVT).

It also follows that a multitude of continuously-variable transmission (CVT) configurations can be modified to include the interface of this invention. With the inclusion of this elastomeric meshing interface, CVT designs become positively engaged drives, rather than friction drives. This positive engagement between the pulley surface and the belt is made possible by the conformance of the elastomer of the belt which allows conformation between the meshing interface gear and subsequent members of the drive train. Other members in the drive train can have smooth surfaces as are used in friction drive mechanisms.

The interface gear and the interface CVT/IVT concepts in accordance with the present invention do not have inherent limits with respect to physical geometry. Moreover, the gear and CVT/IVT components are mathematically related only by the ratios of their physical sizes. Hence, the interface CVT/IVT concepts can be made to any size to accommodate the needs of an application. This feature is of particular advantage for synthesis of compact mechanical actuators.

Possible applications where this invention can have a significant impact are those requiring actuators capable of wide ranges of force or torque capacity, wide ranges of speed capacity, high force/torque-to-weight ratio, and high power-to-weight ratio. Among others, applications in industry, automotive, robotics, and aerospace are envisioned.

It will be understood that numerous modifications and substitutions can be had to the aforedescribed embodiments without departing from the spirit and scope of the invention. For example, although the transmission 20 has been shown and described as utilizing pulleys of conical shape, a transmission which utilizes the pulley surface/belt interface can possess components of any of a number of shapes. For example, there is illustrated in FIG. 5 an embodiment of a transmission, generally indicated 60, having a driving member 62 which is conical in form and a driven member 64 which is cylindrical in form. Unlike the transmission 20 of FIGS. 1–4 wherein the rotation axes of the driving shaft 24 and the driven shaft 26 are substantially parallel with one another, the axes of the driving and driven members 62, 64 of the FIG. 5 transmission 60 are not parallel with one another.

Furthermore, although the indentations 50 defined within the pulley surfaces 36, 38 of the transmission 20 of FIGS. 1–4 are shown and described as being concave (or hemispherical) in form, the indentations can take any of a number of forms. For example, there is illustrated in FIG. 6 a pulley surface 66 (of the FIG. 5 driven member 64) whose indentations, indicated 68, are provided by circular recesses having cylindrical walls 70 and circular bottoms 72.

Accordingly, the aforedescribed embodiments are intended for the purpose of illustration and not as limitations of the invention.

What is claimed is:

1. A system for transmitting driving forces from a driving shaft to a driven shaft by way of an elastomeric belt nipped between opposing surfaces associated with the driving and driven shafts, the improvement characterized in that:

the elastomeric belt is compliant in nature and capable of being deformed so that when nipped and thereby compressed between the opposing surfaces associated with the driving and driven shafts, the thickness of the elastomeric belt is reduced in size; and each of the opposing surfaces defines a plurality of indentations disposed thereacross wherein each indentation includes a cavity for accepting a portion of the elastomeric belt as the belt passes and is nipped between the opposing surfaces and an edge which borders the cavity at the corresponding surface so that as the driving shaft is driven and the belt is nipped and thereby compressed between the opposing surfaces associated with the driving and driven shafts, the portions of the elastomeric belt which are disposed in registry with the indentations of the opposing surfaces distend from the compressed condition and are accepted by the cavities of the indentations so that driving forces from the driving shaft are transmitted between the edges of the indentations and the portions of the belt accepted by the indentations so that the belt and the opposing surfaces are moved in conjunction with one another.

2. The improvement as defined in claim 1 wherein the indentations defined in each of the opposing surfaces are so closely spaced to one another that a plurality of belt portions are accepted by the indentations at any one moment of time.

3. The improvement as defined in claim 1 wherein the portions of the elastomeric belt which are accepted by the indentations act as teeth against which the edges of the indentations apply significant shear and normal forces.

4. The improvement as defined in claim 3 wherein the edge which borders each indentation forms substantially a right angle as a path is traced along the corresponding surface and into the corresponding cavity.

5. The improvement as defined in claim 1 wherein the cavity of each indentation is concave in shape.

6. The improvement as defined in claim 1 wherein the cavity of each indentation is in the form of a circular recess.

7. The improvement as defined in claim 1 wherein the elastomeric belt is a structural belt which is capable of being deformed so that when compressed between the surfaces associated with the driving and driven shafts, the belt portions which are accepted by the indentations tend to conform to the shape of the cavity of the indentations.

8. A system for transmitting forces from a rotatable driving member to a rotatable driven member comprising:

a rotatable driving member having a surface;

a rotatable driven member having a surface which is disposed so as to oppose the surface of the driving member;

an elastomeric belt which encircles one of the driving and driven members and has a section which is nipped between the opposing surfaces of the driving and driven members for transmitting forces between the driving and driven members as the driving member is rotated, the elastomeric belt being complaint in nature and capable of being deformed so that when nipped and thereby and capable of being deformed so that when nipped and thereby compressed between the opposing surfaces of the driving and driven members, the thickness of the elastomeric belt is reduced in size; and the surfaces of each of the driving and driven members include a plurality of indentations disposed thereacross and wherein each of the indentations includes a cavity and an edge which borders the cavity at the surface so that the section of the elastomeric belt which is nipped and thereby compressed between the surfaces of the driving and driven members, the portions of the belt which are disposed in registry with the indentations of the opposing surfaces distend from the compressed condition and are accepted by the cavities of the indentations so that as the driving shaft is rotated, the edges of the indentations cooperate with the portions of the belt accepted by the surface indentations for transferring forces therebetween so that the belt and opposing surfaces are moved in conjunction with one another.

9. The system as defined in claim 8 wherein the surface indentations of each of the driving and driving members are so closely spaced to one another that a plurality of belt portions are accepted by the indentations at any one moment of time.

10. The system as defined in claim 8 wherein the portions of the elastomeric belt which are accepted by the surface indentations act as teeth against which the edges of the indentations apply significant shear and normal forces.

11. The system as defined in claim 10 wherein the edge which borders each indentation forms substantially a right angle as a path is traced along the corresponding surface and into the corresponding cavity.

12. The system as defined in claim 8 wherein the cavity of each indentation is concave in shape.

13. The system as defined in claim 8 wherein the cavity of each indentation is in the form of a circular recess.

14. The system as defined in claim 8 wherein the elastomeric belt is a structural belt which is capable of being deformed so that when compressed between the surfaces of the driving and driven members, the belt portions which are accepted by the indentations tend to conform to the shape of the cavity of the indentations.

15. In a transmission including a rotatable driving member and a rotatable driven member and an elastomeric belt which is nipped between the surfaces of the driving and driven members, the improvement characterized in that:

each of the surfaces of the driving and driven member defines a plurality of indentations disposed thereacross wherein each indentation includes a cavity and an edge which borders the cavity at the corresponding surface; and the elastomeric belt is complaint in nature and capable of being deformed so that when nipped and thereby compressed between the surfaces of the driving and driven members, the thickness of the elastomeric belt is reduced in size so that the portions of the belt which are positioned in registry with the surface indentations distend from the compressed condition and are accepted by the cavities of the indentations and so that as the driving member is rotated for the purpose of transmitting torque from the driving member to the driven member, substantial shear and normal forces are applied between the edges of the indentations and the portions of the belt accepted by the indentations so that the belt and the surfaces of the driving and driven members are moved in conjunction with on another.

* * * * *